Oct. 27, 1964     W. J. SMITH     3,154,176
AUTOMATIC TRANSMISSION REPAIR DEVICE
Filed June 8, 1964
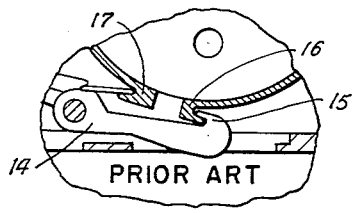
Fig. 1
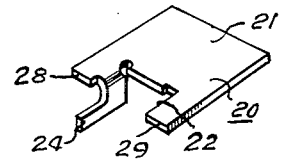
Fig. 3
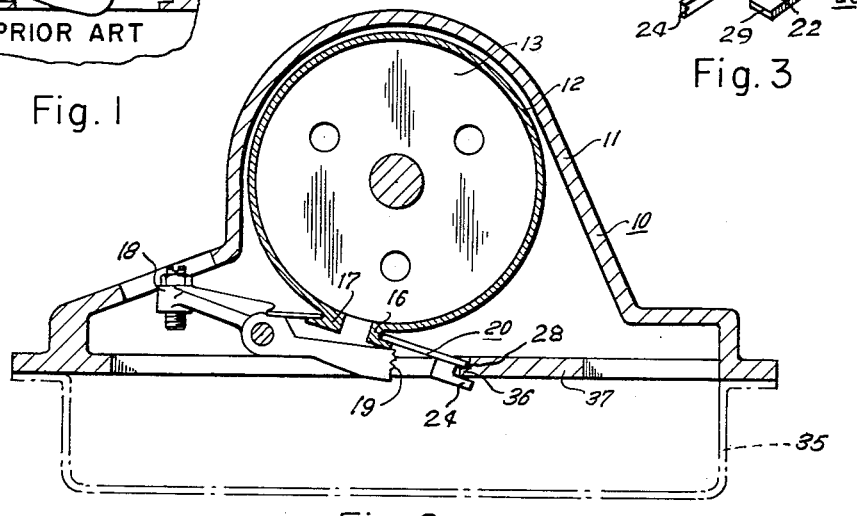
Fig. 2
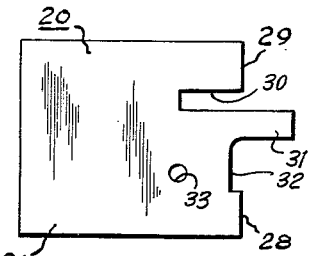
Fig. 4
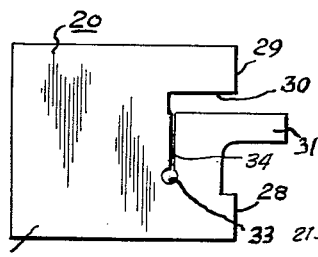
Fig. 6
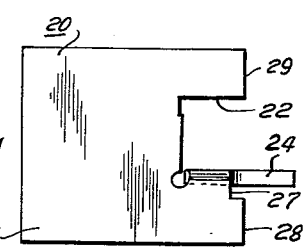
Fig. 8
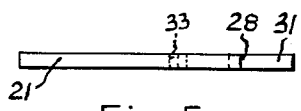
Fig. 5
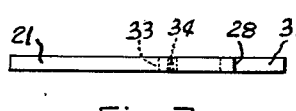
Fig. 7
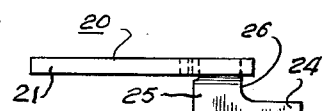
Fig. 9
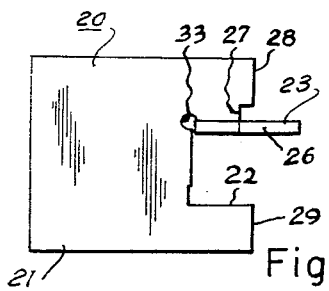
Fig. 10
Fig. 11
INVENTOR
Welton J. Smith
BY Ehley & Ehley
ATTORNEYS

United States Patent Office 3,154,176
Patented Oct. 27, 1964

3,154,176
AUTOMATIC TRANSMISSION REPAIR DEVICE
Welton J. Smith, Oklahoma City, Okla., assignor to Woodrow W. Smith, Grand Prairie, Tex.
Filed June 8, 1964, Ser. No. 373,455
4 Claims. (Cl. 188—77)

This invention relates to new and useful improvements in automatic transmission repair devices.

The invention is particularly concerned with repair devices for replacing broken reverse band links in automotive automatic transmissions.

In certain types of automotive automatic transmissions, a reversing band is utilized which comprises a circular band much like a brake band which is adapted to be tightened upon a cylinder or drum. One end of the band is held against circumferential movement by a retaining hook known as a reverse band link, and the other end of the band is moved by a suitable actuating mechanism to tighten or loosen the band on the drum or cylinder. Quite considerable forces are generated in these automatic transmissions, and it is a common type of failure for the retaining hook to fail in that its bill snaps or breaks off under the heavy loads developed, thus rendering the reverse drive inoperative. The transmission must be almost completely disassembled to replace the broken link, and this is an operation requiring four to six hours labor and accordingly a proportionately heavy expense.

The present invention is directed to a repair device through the use of which the automatic transmission need be only partly disassembled, and the necessary repair may be effected within a time well under one hour, thus affording considerable savings in labor costs for making the necessary repair.

More specifically, the invention comprises a rigid rectangular plate having a notch in one edge. The end portions of the edge adjoining the notch have spaced abutment surfaces which are positioned to symmetrically bisect the edge in relation to the notch and in respect to the axis thereof. A shanked keeper hook projects perpendicularly from one face of the plate at one lateral margin of the notch. The hook has its bill extending parallel to the face of the plate and is spaced from and projects beyond the plane of the abutment surfaces. Also, the shank of the keeper hook is recessed toward the body of the plate from the plane of the abutment surfaces.

It is, therefore, a principal object of this invention to provide an improved repair device for replacing broken reverse band links in automotive automatic transmissions.

A further object of the invention is to provide an improved repair device for automotive automatic transmissions which requires only minor disassembly of the transmission, and which may be snapped readily into place to take over the function of the broken reverse band link.

Yet another object of the invention is to provide an improved repair device for automotive automatic transmissions which is simple and inexpensive in structure yet quite durable and effective in performance, being much less susceptible to subsequent damage than the broken link which it replaces.

Other and more particular objects of the invention will be apparent from a reading of the following description.

A construction designed to carry out the invention will be hereinafter described together with other features of the invention.

The invention will be more readily understood from a reading of the following specification and by reference to the accompanying drawing, wherein an example of the invention is shown, and wherein:

FIG. 1 is a fragmentary view, partly in elevation and partly in section, illustrating the reverse band link as presently existent in the prior art, FIG. 2 is a transverse sectional view illustrating the replacement of the broken reverse band link with a repair device constructed in accordance with the present invention, FIG. 3 is a view in perspective of the repair device constructed in accordance with this invention, FIG. 4 is a plan view illustrating the initial step in forming the repair device, FIG. 5 is a side elevation taken at right angles to FIG. 4, FIG. 6 is a plan view illustrating a second step in the forming of the repair device, FIG. 7 is a side elevational view taken at right angles to FIG. 6, FIG. 8 is a plan view illustrating the completed repair device, FIG. 9 is a side elevational view taken at right angles to FIG. 8, FIG. 10 is a bottom plan view of the repair device, and FIG. 11 is an end elevational view of the repair device.

In the drawings, the numeral 10 designates a type of automatic automotive transmission having a housing 11 within which a reverse band 12 is disposed, the band encircling a drum or cylinder 13 and being engageable and disengageable therewith by circumferential tightening and loosening actions to actuate or deactuate the reverse drive. In the conventional prior art structure, as shown in FIG. 1, a reverse band link 14 is provided with an end hook portion 15 which engages one end 16 of the band 12, the other end 17 of the band being actuated by a suitable mechanism 18 for tightening and loosening the band upon the drum 13.

In use, and due to the heavy loads and sudden shock loads often applied to the band 12, the hook portion or bill 15 of the link 14 tends to snap off, as illustrated at 19 in FIG. 2, thus rendering the reverse drive inoperative and necessitating repair of the transmission. This is a relatively common type of mechanical failure in these transmissions.

Heretofore, it has been necessary to disassemble the transmission almost completely in order to replace the link 14 with a new link, and this operation normally requires from four to six hours labor, obviously an expensive type of repair to make.

With the present invention, the repair device 20 forming the subject matter of this invention is merely snapped into place in order to hold the end 16 of the band 12 against movement, a repair operation requiring some thirty to forty minutes of time and obviously reflecting a considerable saving in cost.

The repair device 20 includes a rectangular plate 21 formed of a heat treatable steel alloy of appreciable strength such as chrome-molly steel, commonly known as S.A.E. 4130, and is provided with a rectangular notch 22 in one end or marginal edge. A keeper hook 23 is bent or deformed from one margin of the notch 22 and projects at right angles to one face of the plate 21, the hook 23 having a tongue or bill 24 extending parallel to but spaced from the plate 21 and projecting beyond the marginal edge of the plate. The shank 25 of the hook 23 is recessed at 26 toward the balance of the plate 21, and this recess is carried into the marginal edge of the plate, as shown at 27, to provide an abutment surface 28 of equal width, dimensions, and size as the abutment surface 29 formed between the opposite margin of the notch 22 and the adjoining marginal edge of the plate 21. Thus, there are provided a pair of spaced apart abutment surfaces 28 and 29, symmetrically positioned with respect to the axis of the plate 21 extending through and bisecting the notch 22 as well as with respect to the opposite marginal edge of the plate.

The repair device 20 may be fabricated in several ways, it having been found desirable to stamp or otherwise form the plate first, as shown in FIG. 4, with a narrow longitudinal notch 30 adjacent one marginal edge of the plate and simultaneously to form the projecting tang 31 which will become the tongue 24 and also to provide the recessed section 32 which will become the recessed sections 26 and 27, together with the transverse opening 33 at the inner extremity of the bending line. The plate is then cut at 34 from the opening 33 to the notch 30, as shown in FIG. 6, and the keeper hook bent into its perpendicular or right-angular position, as shown in FIG. 8. The opening 33 obviates the tendency of the plate to tear at the inner end of the bent portion and facilitates the bending operation.

In use, the broken bill 15 of the link 14 is removed completely with a chisel in the event the hook has merely cracked and has not completely broken off so that the link 14 is in the condition shown in FIG. 2. Of course, in order to provide access to the link 14, the pan and valve cover, indicated at 35 in FIG. 2, is first removed. The continuous edge of the plate 21 is then engaged with the end portion 16 of the band 12 and the abutment surfaces 28 and 29 merely snapped upwardly over the short lip 36 which is present in the lower plate 37 of this type of transmission. The repair device 20 is thus anchored securely in position, the tongue 24 of the keeper hook preventing upward displacement of the repair device, and the abutment surfaces 28 and 29 preventing downward dislodgment. Being formed of a strong, heat-treated steel alloy, and being loaded by the band 20 only in axial or columnar stress, the repair device provides a very strong, rigid and durable stop member for the end 16 of the reverse band 12 and is not subject to subsequent failure. The bottom plate 37 is a relatively heavy casting and provides a very secure support member for the repair device.

Being a casting, the wall above the lip 36 is often moderately rough, and is not readily accessible for grinding or smoothing operations. Accordingly, the spaced apart abutment surfaces 28 and 29 permit proper positioning of the repair device even though the casting may be somewhat rough and would not accommodate the entire lateral edge of the repair device without misalinement occurring. In most instances, no adjustment of the reverse band is required since the repair device accurately positions the end 16 of the reverse band at the dsired location.

The pan and valve cover are then replaced and the repair is completed with assurance that the tendency of the link 14 to fail in operation has been permanently eliminated.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An automatic transmission repair device for use in replacing broken reverse band links in automatic automotive transmissions including a rigid rectangular plate having a notch in one edge thereof, the end portions of said edge adjoining the notch forming spaced abutment surfaces symmetrically positioned with respect to the axis of said plate bisecting said edge through the notch, and a keeper hook projecting perpendicularly from one face of the plate at one lateral margin of the notch, the hook having its bill extending parallel to the latter face of the plate but spaced therefrom and projecting beyond the plane of said abutment surfaces.

2. An automatic transmission repair device for use in replacing broken reverse band links in automatic automotive transmissions including a rigid rectangular plate having a notch in one edge thereof, the end portions of said edge adjoining the notch forming spaced abutment surfaces of equal areas and dimensions symmetrically positioned with respect to the axis of said plate bisecting said edge through the notch, and a keeper hook projecting perpendicularly from one face of the plate at one lateral margin of the notch, the hook having its bill extending parallel to the latter face of the plate but spaced therefrom and projecting beyond the plane of said abutment surfaces.

3. An automatic transmission repair device for use in replacing broken reverse band links in automatic automotive transmissions including a rigid rectangular plate having a notch in one edge thereof, the end portions of said edge adjoining the notch forming spaced abutment surfaces symmertrically positioned with respect to the axis of said plate bisecting said edge through the notch, and a keeper hook having a shank, said hook projecting perpendicularly from one face of the plate at one lateral margin of the notch, the hook having its bill extending parallel to the latter face of the plate but spaced therefrom and projecting beyond the plane of said abutment surfaces, the shank of the keeper hook being recessed toward the body of the plate from the plane of said abutment surfaces.

4. An automatic transmission repair device for use in replacing broken reverse band links in automatic automotive transmissions including a rigid rectangular plate having a notch in one edge thereof, the end portions of said edge adjoining the notch forming spaced abutment surfaces symmetrically positioned with respect to the axis of said plate bisecting said edge through the notch, and a keeper hook having a shank, said hook projecting perpendicularly from one face of the plate at one lateral margin of the notch, the hook having its bill extending parallel to the latter face of the plate but spaced therefrom and projecting beyond the plane of said abutment surfaces, the shank of the keeper hook and the portion of the aforesaid edge of the plate between the shank and the adjoining abutment surface being recessed toward the body of the plate from the plane of said abutment surfaces.

References Cited by the Examiner

UNITED STATES PATENTS

| | | | |
|---|---|---|---|
| 2,182,386 | 12/39 | Patterson | 188—77 |
| 2,671,534 | 3/54 | Nutt | 188—77 |
| 2,694,948 | 11/54 | McFarland | 188—77 X |

References Cited by the Applicant

UNITED STATES PATENTS

| | | |
|---|---|---|
| 2,701,630 | 2/55 | Horton et al. |
| 2,767,810 | 10/56 | Farkas et al. |
| 2,847,093 | 8/58 | De Lorean. |
| 3,103,991 | 9/63 | Flinn. |

WILLIAM FELDMAN, *Primary Examiner.*

MYRON C. KRUSE, *Examiner.*